June 10, 1930.  E. G. TEMPLETON  1,763,568
TRIMMING DEVICE FOR TIRE BUILDING MACHINES
Filed Nov. 24, 1925
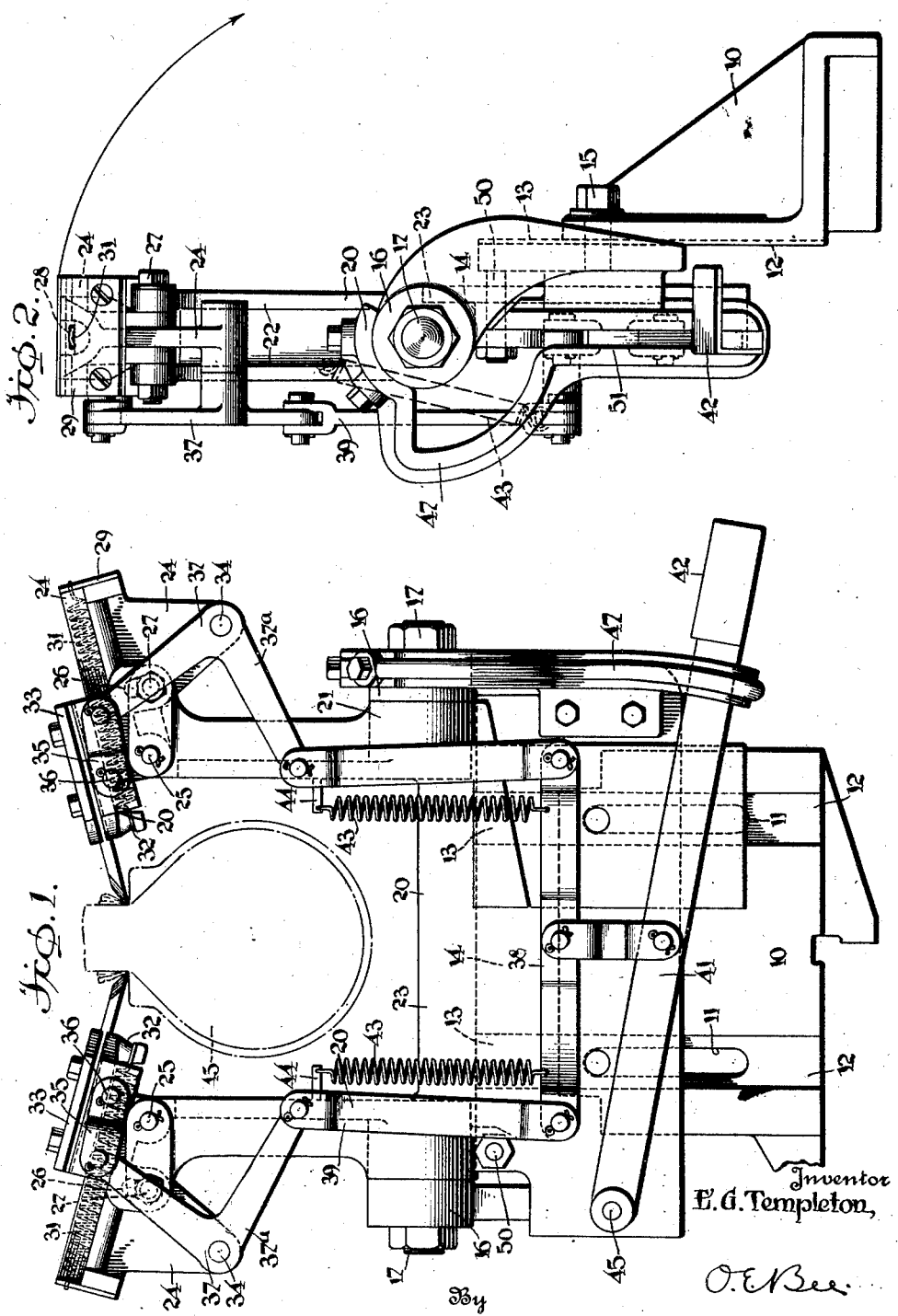
Inventor
E. G. Templeton,
By O. E. Bee
Attorney Patented June 10, 1930

1,763,568

UNITED STATES PATENT OFFICE

EDWIN G. TEMPLETON, OF AKRON, OHIO, ASSIGNOR TO THE GOODYEAR TIRE & RUBBER COMPANY, OF AKRON, OHIO, A CORPORATION OF OHIO

TRIMMING DEVICE FOR TIRE-BUILDING MACHINES

Application filed November 24, 1925. Serial No. 71,243.

My invention relates to tire building machines and it has particular relation to that portion thereof which is adapted to trim the excess textile material from the fabricated product.

One object of my invention is to provide a device which will effect the severing operation by a linear movement of the cutting edges.

Another object of my invention is to provide a device which is readily adjustable with reference to the plane of approach which a cutting tool makes with the core as well as the point of engagement therewith.

Another object of my invention is to provide a trimming device in which oppositely disposed cutting edges apply substantially equal forces during the severing operation.

In the core built method of building tires, a plurality of plies of rubberized fabric are disposed about a suitable mandrel, after which a set of beads are applied, that are covered and secured by the opposite edges of the fabric. Oftentimes after this operation considerable excess fabric or selvage remains which must be removed before the tire can be vulcanized. It is not uncommon to trim the tire by means of a hand tool although mechanical devices have been constructed which may be employed, such for example as that disclosed in Patent No. 1,495,344.

I have found that in effecting this operation by a trimming machine, it is desirable that the cutting edges act independently in so far as the distance traveled is concerned, but it is equally desirable that they cooperate in applying substantially equal force against the core during the cutting operation. I have also found that certain advantages are to be enjoyed if the knife approaches the core by a linear movement and at any angle with respect to the horizontal, which may be desired. The device which I have constructed embodies means for accomplishing the cutting operation in the manner hereinabove set forth.

A better understanding of my invention may be had by referring to the drawings, in which:

Fig. 1 is a front elevational view of a device constructed in accordance with the principles of my invention, together with a transverse section of a core of a tire building machine; and Fig. 2 is a side elevational view of the device illustrated in Fig. 1.

The device is mounted on a base 10 of any suitable construction which may be joined to the tire building machine in any convenient manner. It is provided with two vertical slots 11 together with grooved or notched portions 12 parallel thereto which are adapted to mesh with complementary raised portions 13 in a frame plate 14 that is maintained in adjustable relation with the base by means of a nut and bolt connection 15. Near the ends of the frame plate and unitary therewith are arms 16 whose free ends are bossed to accommodate an extended bolt 17 about which a cutting mechanism 20 pivots.

The entire cutting mechanism pivots on aligned journal portions 21 of its frame which includes two sets of upwardly extending arms 22 joined at their base by a plate portion 23. The arms are constructed symmetrically. Each set supports a guide block 24 which pivots about a pin 25 a distance that is determined by the length of an arcuate slot 26. The block is held in adjustment by a bolt 27. Its upper portion has a deep groove 28 along its center. A back plate 29 is joined to the block by screw connections and holds one end of a spring 31 which is housed in the grooved or Y-shaped portion of the block. The other end of the spring is connected to a knife holder 32 which surrounds the outer portion of the Y-shaped block and is adapted for linear movement along the surface thereof. It will be noted that inasmuch as the back plate remains stationary, the spring will, at all times, urge the block in the direction of the plate. The cutting tool or knife is fitted to the slidable block by a plate 33 which is itself bolted to the knife holder. One end of a link 35 pivots about a short outwardly extended lug 36 which is joined to the knife holder; the other end thereof is likewise pivotally joined to a bell crank 37. The bell crank pivots about a pin 34, which is supported by the lower bossed portion of the block 24. The other end of the bell crank is joined to one end of a link 38 by a link 39 which is pivotally connected at both ends. The fulcrum of the link 38 is linked to an arm 41 of a pedal 42 and is actuated thereby.

The position of the device as illustrated in the drawing shows the knives against a core 45 of a tire building machine after the cutting operation has been completed. In order to insure that the cutting tools will return to their normal position after the cutting operation, an additional set of springs 43 are employed, one end of which is joined to the lever 38 and the other to a short lug 44 that is made unitary with the arms 22 of the tool frame. The pedal, which is pivoted about a pin 45 in the plate portion of the frame, is governed by a guard 47 which also acts as a safety.

In order to insure that the cutting device is in an exact predetermined position, a nut and bolt 50 are provided in the plate portion of the movable frame which engages the stationary frame 14. By this means, the limit of swing is determined exactly. On the other hand, in order to insure that the device has completed its swing before the knives are caused to approach each other, the guard member 47 has been designed as shown. It will be noted that during the period of inoperativeness, the knives together with the holders rest against the back plate. In this position, the severing device may pivot 90° about the bolt 17 or until the pedal engages the radial portion of the guard 47, indicated by numeral 51.

In practicing my invention, after the operator has completed the building operation to the point where the severing of the excess of fabrication is in order, he causes the cutting unit to swing into a vertical position. When the pin 50 reaches the back plate, the pedal may be moved downwardly, thus causing the knives to approach each other. After the pedal has started its movement in a downward direction, the device is locked in a vertical position, since the bolt 50 determines the limit of counter-clockwise movement of the device and the vertical portion of the guard member, indicated by the numeral 51, with which the pedal is in slidable engagement, prevents any clockwise movement. By continuing the downward movement of the pedal, the resistance which the knives meet is balanced by the link 38 which distributes the force applied to the pedal by the operator. When the cutting operation is completed, the pedal is released, thereby allowing the springs to return the knives, together with the bell crank and link arrangement, back to their normal position, before the unit is caused to swing 90° into its horizontal position.

It is to be noted that the block 32, on which the knife holder slides, may be moved through an appreciable angle by loosening the bolt 27 and permitting it to pivot about the pin. It should also be observed that the pin opening in the arm 37ª of the bell crank 37 when in its inoperative position coincides with the pin 25 about which the block pivots. This is desirable inasmuch as it obviates the necessity of an adjustable link in place of the unitary member 39. Without this feature, changing the angle of the block would change the distance between the arms of the bell crank and those of the lever below. As constructed, however, the necessary vertical adjustment may be effected entirely by the slot and frame joint. The knives may be removed from their holders, by loosening the bolts which secure the top plate firmly against the holder.

Although I have described but a single device embodying the principles of my invention, it will be apparent to those skilled in the art that many modifications may be made without departing from the spirit or scope thereof, and I desire that only such limitations shall be imposed as are consistent with prior art and the appended claims.

What I claim is:

1. The combination with a tire building machine having a rotatable core, of a trimming device comprising upstanding arms disposed on each side of the core, positively interconnected knife holders slidably disposed upon the upper ends of the arms and operating means connected to the knife holders simultaneously to actuate them toward the core.

2. The combination with a tire building machine having a rotatable core, of a trimming device comprising upstanding arms disposed on each side of the core, angularly adjustable members disposed upon the upper ends of the arms, knife holders slidably secured to the angularly adjustable members and means connected to the holders simultaneously to actuate them toward the core.

3. The combination with a tire building machine having a rotatable core of a trimming device comprising upstanding arms disposed on each side of the core, angularly adjustable members disposed upon the upper ends of the arms, knife holders slidably secured to the angularly adjustable members and means connected to the holders simultaneously to actuate them toward the core, said means comprising bell crank levers pivoted at their apices to the adjustable members and operatively connected to the knife holders at one end, links connected at the other end, and a pedal connected to the links whereby to operate them simultaneously.

In witness whereof, I have hereunto signed my name.

EDWIN G. TEMPLETON.